US008813154B1

(12) United States Patent
Sivertsen

(10) Patent No.: US 8,813,154 B1
(45) Date of Patent: Aug. 19, 2014

(54) INJECTING A CODE INTO VIDEO DATA WITHOUT OR WITH LIMITED HUMAN PERCEPTION BY FLASHING THE CODE

(71) Applicant: American Megatrends, Inc., Norcross, GA (US)

(72) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/708,804

(22) Filed: Dec. 7, 2012

(51) Int. Cl.
| H04N 7/173 | (2011.01) |
| G06K 7/10 | (2006.01) |
| H04N 21/462 | (2011.01) |
| G06K 7/14 | (2006.01) |
| G06F 3/00 | (2006.01) |
| H04N 7/10 | (2006.01) |
| G06K 15/00 | (2006.01) |
| G06Q 30/00 | (2012.01) |
| G06Q 30/02 | (2012.01) |

(52) U.S. Cl.
CPC .............. H04N 21/4622 (2013.01); G06K 7/14 (2013.01); *G06Q 30/0244* (2013.01)
USPC ............... 725/113; 725/51; 725/32; 725/109; 235/462.1; 235/462.11; 235/462.07; 235/462.09; 235/462.13; 705/14.43; 705/14.49; 705/14.68

(58) Field of Classification Search
CPC .......... H04N 21/4622; H04N 21/8586; H04N 5/44543; G06K 7/1417; G06K 19/06037; G06K 7/14; G06Q 30/0244; G06Q 30/02; G06Q 30/0242
USPC ................... 725/113, 109, 51, 32; 235/462.1, 235/462.04, 462.07, 462.08, 462.09, 235/462.13, 462.15, 462.11, 468; 705/14.43, 14.49, 14.68
See application file for complete search history.

(56) References Cited

U.S. PATENT DOCUMENTS

| 6,411,725 | B1 | 6/2002 | Rhoads |
| 7,188,186 | B1 | 3/2007 | Meyer et al. |
| 2006/0086796 | A1* | 4/2006 | Onogi ........................... 235/454 |
| 2006/0259924 | A1* | 11/2006 | Boortz ............................ 725/32 |
| 2008/0023546 | A1 | 1/2008 | Myodo et al. |
| 2008/0089552 | A1 | 4/2008 | Nakamura et al. |
| 2010/0001072 | A1* | 1/2010 | Onogi ........................... 235/454 |
| 2012/0209749 | A1* | 8/2012 | Hammad et al. ............. 705/27.1 |
| 2012/0226586 | A1* | 9/2012 | Paul ........................... 705/26.61 |
| 2013/0097634 | A1* | 4/2013 | Jin et al. ......................... 725/34 |

OTHER PUBLICATIONS

"How Many Frames per Second Can the Human Eye See?" [online][retrieved on Nov. 3, 2012] retrieved from: http://www.100fps.com/how_many_frames_can_humans_see.htm, 7 pps.
Makhloufi, A. "Quantization Watermarking Integrated in a Wavelet Compression System", Proceedings ISCCSP Mar. 13-15, 2006, Marrakech, Morocco, 4 pps.

* cited by examiner

*Primary Examiner* — Hoang-Vu A Nguyen-Ba
(74) *Attorney, Agent, or Firm* — Hope Baldauff, LLC

(57) ABSTRACT

A playlist and a digital advertisement are received. The digital advertisement is output to a screen on the basis of information in the playlist. A code is generated based on the information in the playlist and the generated code is output to the screen. The generated code is output to the screen by flashing the generated code on the screen at a predetermined flash frequency and for a predetermined flash time so that the generated code is visually imperceptible or barely detectable to a human viewer. A suitable equipped electronic device may detect the code and utilize information encoded in the code in various ways.

18 Claims, 9 Drawing Sheets

INJECTING A CODE INTO VIDEO DATA WITHOUT OR WITH LIMITED HUMAN PERCEPTION BY FLASHING THE CODE

BACKGROUND

Digital signs are increasingly replacing traditional paper-based signs, such as posters, painted billboards, and light boxes. There are many reasons why this switch to digital signs is taking place. For example, prices for display configurations capable of showing digital content have dropped considerably over the years and continue to fall. Moreover, the cost, time delay, and inconvenience of distributing printed material have been steadily increasing due to, for example, rising fuel costs and worsening traffic conditions in many cities. Furthermore, capturing and holding the attention of consumers now often requires the use of animated graphics, sound, and even three-dimensional ("3D") content, and the most convenient and often the only way to achieve this is through the use of digital signs and digital content. In addition, the waste associated with the use of printed material runs counter to current trends in environmental protection that emphasize the limited use of paper products.

As advertisements are shown on a digital sign, there will inevitably be instances when some people passing by or stopping in front of the digital sign will desire more information about the products or services being advertised. For example, some people may want to know a Uniform Resource Locator ("URL") that points to a file at a certain domain related to the advertised product or service, a phone number that can be used to order a product or talk to a service representative, a physical or electronic mail address of the company advertising on the digital sign, the model number of the product being advertised on the digital sign, or other types of information. Similarly, companies advertising on the digital sign may want to provide additional information or promotional opportunities to potential customers, such as a promotional coupon, a rebate, an access token, text describing the product or service in greater detail, or other information.

It is with respect to these and other considerations that the present invention has been made.

SUMMARY

Concepts and technologies are disclosed herein for injecting a code into video data without human perception, or with limited human perception. In order to provide this functionality, a playlist and a digital advertisement may be received, such as from a World Wide Web ("Web") service via the Internet in one embodiment. The digital advertisement is output to a screen on the basis of information in the playlist. Additionally, a code is generated based on the information in the playlist and the code is also output to the screen. The generated code may be output by flashing the generated code on the screen at a predetermined flash frequency and for a predetermined flash time, so that the generated code is visually imperceptible, or barely detectable to a human viewer. The generated code is, however, detectable and decodable by a suitably configured computing apparatus.

In order to read the code, a computing apparatus may be equipped with a camera, a memory, a processor, and an operation switch. When a user presses the operation switch, light coming into the camera is converted into digital data and the digital data is stored in the memory of the apparatus. The processor then performs a frame-by-frame analysis of the digital data stored in the memory to determine whether a code is included in the digital data. If a code is included in the digital data, a signal is output to the user indicating that the code is included in the digital data. The code may also be decoded to obtain information encoded in the code. The decoded information may then be utilized in various ways, such as by causing a Web browser application to load an encoded URL.

The subject matter described herein might also be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
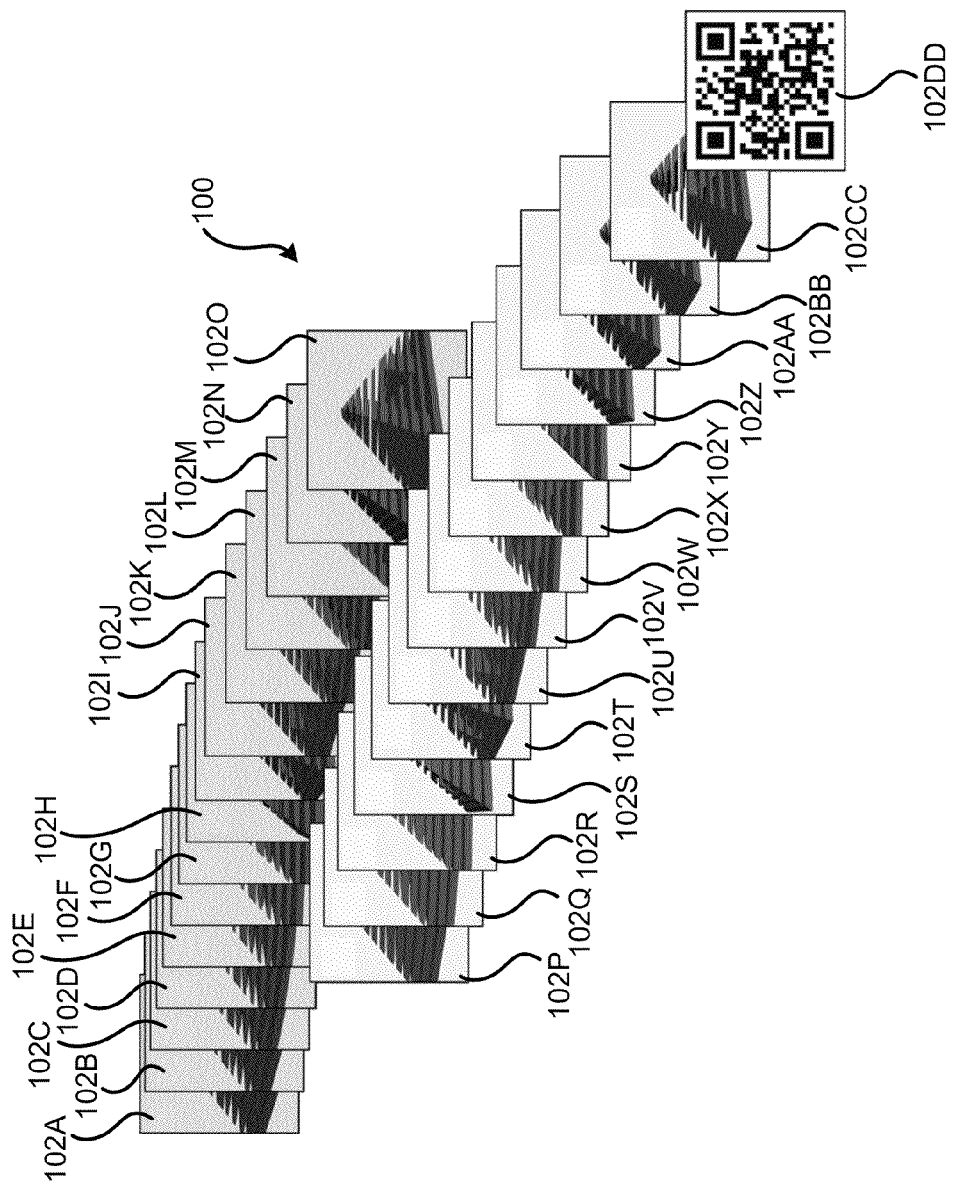
FIG. 1 is pictorial diagram illustrating one mechanism for injecting a code into video data for a duration corresponding to the display of a single frame of the video data, according to one embodiment disclosed herein.

Embodiments disclosed herein provide concepts and technologies for injecting a code into video data, such as a digital advertisement, without human perception or with limited human perception. In the following detailed description, references are made to the accompanying drawings that form a part hereof, and in which are shown by way of illustration of specific embodiments or examples. Referring now to the drawings, in which like numerals represent like elements through the several figures, aspects of the concepts and technologies presented herein will be described.

As will be described in greater detail herein, a code may be injected into a video stream, such as a digital advertisement shown on a digital sign. The digital advertisement may include still or moving pictures. The code may provide more information regarding the product or service being promoted through the digital advertisement. For example, some people may want to know a URL that points to a file at a certain domain related to the product or service, a phone number that can be called to order the product being advertised or to ask questions about the advertised product or service, a physical or electronic mail address of the company that manufactures the advertised product or provides the advertised service, the model number of the product being advertised, or other similar information. Similarly, companies advertising on a digital sign may want to provide additional information or promotional opportunities to potential customers, such as a promotional coupon, a rebate, an access token, text describing the product or service in greater detail, or other similar information.

In some implementations, the code is injected into a video stream in such a manner that the code occupies the entire screen of the digital sign (i.e., is substantially equal in size to the size of the frames in the advertisement video stream), rather than only a portion thereof. The code is also injected such that the code is only displayed for a brief instant such that the code remains invisible to a human viewer, or is only minimally perceptible. A code injected into a video stream in this manner may, however, be detected and decoded by a dedicated reader device, or a general-purpose device with a suitably configured reader application. That is, while the code may be invisible or minimally perceptible to humans, a device with appropriate hardware and the software detect the presence of the code, read the code, and decode the data contained in the code to obtain the encoded information. The encoded information may then be displayed to a user or otherwise utilized depending upon the type of data.

Because the code is injected into a video stream in some embodiments so that it occupies the entire screen of the digital sign, a person desiring to obtain more information regarding the product or service being promoted by the digital advertisement may do so from a distance. That is, by using a camera-enabled portable device, such as a smartphone, a tablet computer, or a personal digital assistant ("PDA"), or alternatively by using a dedicated reader, a user could stand a distance from a digital sign and read the code injected in the digital advertisement using an application stored in the portable device or reader. Ensuring that the code is injected so that it occupies the entire screen of the digital sign would be convenient for the user and in some instances may be beneficial, such as when the digital sign is on top or on the side of a building, or otherwise located at a distant position. As an example, the lens on a smartphone may not have a high enough zoom ratio to detect a code that is displayed in the corner of an image, but would be able to do so when the code is provided in a manner occupying the entire screen of the digital sign. Additionally, injecting the code in such a way that the code remains invisible or only minimally perceptible to humans allows the digital advertisement to remain aesthetically pleasing and, as a result, may provide for more effective advertising.

Some conventional techniques superimpose a code onto a color image. With such conventional techniques, an attempt is made to superimpose the code in a manner that hides the code within an image, such as by finding an area of the image with a color pattern that best matches the color pattern used for the code. The code, however, remains in plain view. Such an implementation is not desirable in view of the fact that advertisers go to great lengths to make their advertisements as aesthetically pleasing as possible. In many instances, companies pursue a minimalist approach to their advertisements, such that a code embedded in plain view would greatly detract from the aesthetics of the advertisement and direct attention away from the products or services being advertised.

Since such an embedded code displayed using conventional techniques occupies only a small portion of an image, people wanting to read the code must place a dedicated reader or a device with the correct reader application close to the video display in order to scan the image of the code, particularly when they are at a distance from the display. As an example, a Quick Response ("QR") code may be placed in the corner of a displayed advertisement, and a user with a camera phone may scan the QR code to open a Web page in the phone's browser related to the advertised product or service. However, when the image is displayed on a large electronic billboard placed, for example, on top of a building, it may not be practical or possible to place a dedicated reader or device with a reader application in close proximity to the advertisement.

The various concepts and technologies disclosed herein address some or all of the problems set forth above. In particular, through an implementation of the concepts and technologies disclosed herein, a code can be injected into a video stream, such as an digital advertisement, without human perception or with limited human perception. Additionally, a code can be injected into the video stream in a manner that allows the code to be detected even when a reader device is not in close proximity to the display of the digital advertisement. It should be appreciated that although the embodiments disclosed herein are primarily presented in the context of a QR code, other types of codes might be utilized. For instance, a code may be a linear barcode, such as a Universal Product Code ("UPC"), another type of matrix ("2D") barcode, or any other machine-readable code that is a representation of data.

Utilizing conventional techniques, an advertisement that is distributed to many different types and sizes of digital signs will often be converted to many different encoding formats and scaled to fit a specific type, size and format of display. It is, therefore, not practical to embed a QR code as part of the video data. Additionally, it might depend on the individual sign how quickly a digital sign can change the frame of the display to flash the QR code, which is only known by that individual sign based on the parameters of the display technology used, video drivers, and other integrated technologies.

As will be described in greater detail below, the technologies disclosed herein embed the QR code as digital metadata in a video clip or picture. When the software and video/image player in a digital sign detects such metadata, it can then engage the method suitable for that particular digital sign to display a QR code for the necessary frequency and duration to be readable from a desired distance for that particular digital sign, which may not be equally suitable if the QR code had been encoded as part of the video stream itself. The QR code may be sent in the metadata of the video itself, but might also be transferred independently of the video between an advertising Web service and the digital billboard. Additional details regarding these processes are provided below.

FIG. 1 is an illustration of how a QR code may be injected into a video stream 100 for a duration corresponding to display of a single frame 102 during one second of a video stream 100 with a frame rate of thirty frames per second ("fps"). In the example shown in FIG. 1, the individual frames 102A-102DD of the video stream 100 are shown, with the frame 102DD containing the QR code. Such a set of conditions is shown to simplify the drawing shown in FIG. 1. For an actual implementation, however, it may be necessary to inject the QR code for a period corresponding to approximately $\frac{1}{500}^{th}$ of a second or shorter so that the injected QR code is not visually perceptible to humans. In some embodiments, this may involve injecting the QR code for a period corresponding to less than that for a single frame 102. In some embodiments, it may be possible to utilize a frame rate of 500 fps or greater and to inject the QR code for a duration corresponding to the duration that one frame is displayed. That is, with a frame rate of 500 fps and assuming injection of the QR code for a period corresponding to one frame, the QR code would be injected as one frame every 500 frames per second, or for $\frac{1}{500}^{th}$ of a second. It is noted that the duration during which a code is injected may be referred to herein as "injection time" or "flash time," and the operation of injecting a code on a screen of a display device may also be referred to herein as "flashing" a code.

It may be desirable or necessary to increase or reduce the injection time in some instances. For example, it may be determined through analysis of the digital advertisement that the difference in brightness between the advertisement and the code is high. Since the human eye is highly sensitive to changes in brightness (i.e., to changes in contrast), it may be desirable to reduce the injection time in such an instance where the difference in brightness between the code and the digital advertisement is high. When the contrast between the code and the digital advertisement is low, on the other hand, it may be possible to flash the code for a longer duration. Additional details regarding this aspect will be provided below with regard to FIGS. 6 and 7.

In embodiments where it is desirable for the code to be only minimally detectable by humans, it may be desirable to flash the code for $\frac{1}{300}^{th}$ of a second. In some embodiments, a video stream 100 with a frame rate of 300 fps may be used and the code may be injected for a duration corresponding to one frame ($\frac{1}{300}^{th}$ of a second) so that the code is only barely detectable. It is believed that that it would require an injection time of roughly this duration so that the code is slightly detectable. It may be possible to increase or decrease the injection time, depending on the characteristics of the digital advertisement as described above.

Also, it may be possible to vary the frequency at which the code is injected into the video stream of the digital advertisement. For example, with a frame rate of 300 fps and assuming an injection time corresponding to the time that one frame is displayed, the code may be injected every 1.2 seconds, which would make the code less intrusive (but still visible in view of the injection time) than injecting the code every second. Alternatively, the code may be injected every 0.9 seconds, which would make the code more intrusive than injecting the code every full second. When an advertiser desires to ensure that the public is made aware of the presence of a code in an advertisement, the code may be made more intrusive in this manner and therefore more visible.

As discussed above, it may be desirable for a code to occupy the entire screen of a digital sign upon which the digital advertisement containing the code is displayed. That is, it may desirable for the code to be injected as an entire frame 102, rather than as part of a frame 102 or a part of multiple frames 102. When the code occupies the entire screen of the digital sign, a person desiring to obtain more information of the product or service being promoted by the digital advertisement could do so from a distance. This may be necessary when the digital sign is at a distance from a user and the portable device used by the user has limited zooming capabilities. For example, the digital sign may be positioned on a billboard that is high off the ground. Moreover, it may be desirable for the code to be injected separately from the video stream of the digital advertisement so that it does not undergo compression together with the digital advertisement. Additional details regarding these aspects will be provided below with regard to FIGS. 2-9.

Figure 2B:
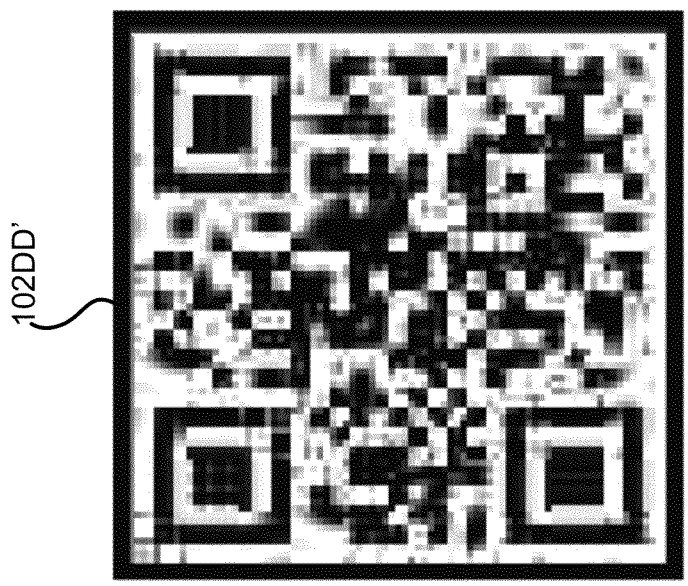
FIGS. 2A-2B are pictorial diagrams showing how a code may become unreadable as a result of the application of video compression.
Figure 2A:
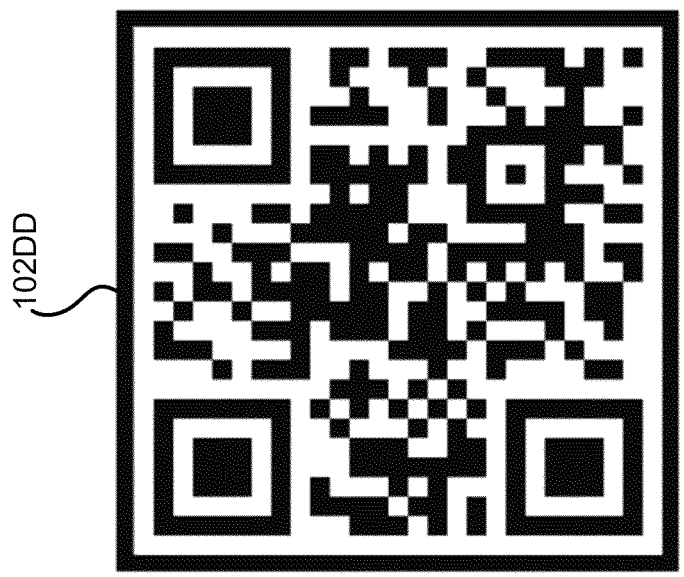

FIGS. 2A-2B are pictorial diagrams showing how a code may become unreadable as a result of the application of video compression. In particular, and as shown in FIG. 2A, a QR code is typically black and white, and very "binary" in nature, meaning it consists of very sharp transitions between pixels to represent binary data in an image form.

As shown in FIG. 2B, however, when a QR code is compressed, the code becomes blurry and, therefore, less detectable by portable devices and applications executed thereby for converting a picture of the code back into useful information. As a result, in some embodiments disclosed herein, the code is injected separately from the digital advertisement so that it is not compressed prior to being displayed. Additional details regarding this aspect will be provided below.

Figure 3:
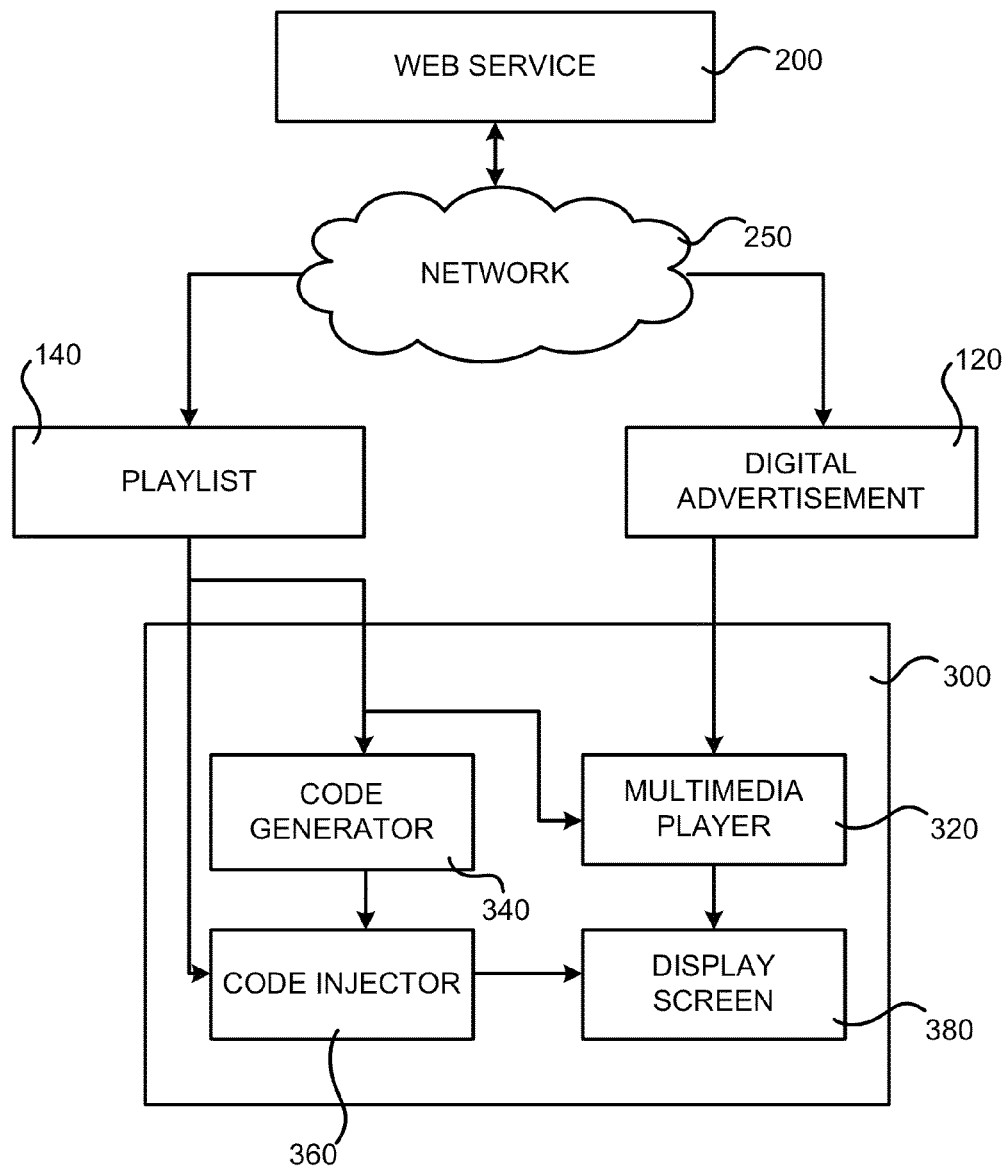
FIG. 3 is a block diagram showing one configuration for an apparatus capable of injecting a code into video data without or with limited human perception, according to one embodiment disclosed herein.

FIG. 3 is a block diagram showing one configuration for an apparatus 300 capable of injecting a code into a video stream 100 without or with limited human perception, according to one embodiment disclosed herein. The apparatus 300 is a digital sign in one embodiment. The digital sign might utilize any suitable display configuration capable of presenting digital content, such as an liquid crystal display ("LCD") monitor, a plasma display, an organic light-emitting diode ("OLED") monitor, or an e-paper ("e-paper") electronic paper display. Other types of displays might also be utilized.

It will be assumed for purposes of illustration that the injected code is a QR code. As discussed above, however, other types of codes may be injected into a video stream, such as a digital advertisement, as described above. Also, the video data is exemplified as a digital advertisement that includes a video stream. However, in some embodiments, the video data may be a digital advertisement including one or more still images.

In one implementation, the apparatus 300 includes a multimedia player 320, a code generator 340, a code injector 360, and a screen 380. In this embodiment, the apparatus 300 is connected to a Web service 200 via a network 250, such as the Internet. The apparatus 300 receives a digital advertisement 120 and a playlist 140 from the Web service 200 via the network 250. In some embodiments, the apparatus 300 may receive media content including multiple digital advertisements 120. The digital advertisement 120 is provided in the form of a video stream (as described above) having a predetermined frame rate. The playlist 140 may be in formats such as Extensible Markup Language ("XML"), JavaScript® Object Notation ("JSON"), or any other suitable format. The playlist 140 may include metadata related to the digital advertisement 120. The playlist 140 may further include data with respect to what information to encode, possibly which type of coding scheme to use, and the manner in which the code is to be injected (e.g., every second for $\frac{1}{500}^{th}$ of a second).

The multimedia player 320 receives the digital advertisement 120 and the playlist 140, and outputs the digital advertisement 120 to the display screen 380 on the basis of information in the playlist 140. For example, the playlist 140 may provide metadata for the multimedia player 320 to play the digital advertisement 120 on the screen 380, such as when to play the digital advertisement 120 on the screen 380 (for example, during which time slots and on which day), how long to play the digital advertisement 120 (such as for how many days), how often to repeat the playing of the digital advertisement 120 (such as the number of repetitions for a certain time slot), etc. In embodiments where the apparatus 300 receives media content including multiple digital advertisements 120, the playlist 140 may specify the order in which the digital advertisements 120 are to be shown, may include repetition information related to the digital advertisements 120, may specify for how long each of the digital advertisements 120 is to be shown, etc.

The code generator 340 receives the playlist 140 from the Web service 200 via the network 250. The code generator 340 then generates a code using the information in the playlist 140. For example, based on the information in the playlist 140, the code generator 140 may generate a QR code, which encodes information related to a URL related to a product being advertised by the digital advertisement 120. The code generator 340 then transmits the generated code to the code injector 360. The coder generator 340 may also transmit the playlist 140 to the code injector 360 at the same time, or the code injector 360 may receive the playlist 140 from the Web service 200 either directly or indirectly following storage (described below).

The code injector 360 injects the generated code into the digital advertisement 120 by outputting the generated code to the display screen 380 on the basis of information in the playlist 140. In some embodiments, the code injector 360 injects the generated code at a predetermined frequency and for a predetermined flash time, such as once every second for $1/300^{th}$ of a second, on the basis of the information in the playlist. In some embodiments, the playlist 140 simply specifies that the code is to be injected in a manner that is invisible or barely detectable to the audience, after which the code injector 360 determines the flash time and injection frequency, such as $1/500^{th}$ of a second every second or $1/300^{th}$ of a second every second. In some embodiments, the playlist 140 may contain information regarding the frame rate of the digital advertisement 120 and/or the display screen 380, and the code injector 360 may inject the generated code based on this information. For example, when the frame rate of the digital advertisement 120 is very high, such as 500 fps, the code injector 360 may use the information of the frame rate in the playlist 140 and inject the code for a flash time corresponding to the duration that one frame in the digital advertisement 120 is displayed.

Figure 4:
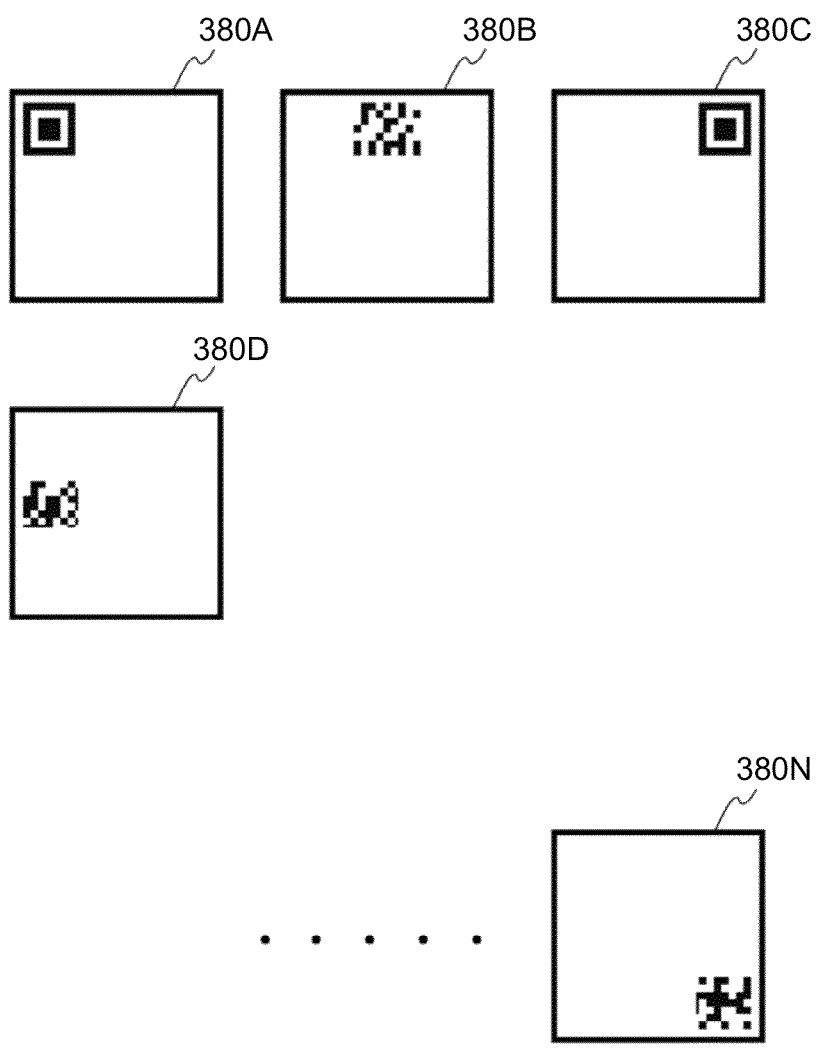
FIG. 4 is a pictorial diagram showing how different portions of a code may be displayed consecutively on a screen of the apparatus of FIG. 3, according to one embodiment disclosed herein.

In some embodiments, with reference to FIG. 4, the code injector 360 injects the generated code in the digital advertisement 120 such that different portions of the code are shown on the display screen 380 in a consecutive manner. In the example shown in FIG. 4, for instance, a QR code is divided into a mosaic of individual portions 380A-380N, and the individual portions 380A-380N are flashed to the screen 380 consecutively. Moreover, each of the individual portions 380A-380N is flashed for an injection time computed such that each portion is minimally visible to a human viewer, such as $1/300^{th}$ of a second. Hence, the portions 380A-380N may be visible and appear as if they are snaking through the screen in a meandering fashion. However, the portions 380A-380N might also be injected in other ways, such as by injecting the portions 380A-380N at the same location or in random locations on the screen 380, or in some other predetermined pattern on the display screen 380. Persons passing by the digital sign 300 may then proceed to point their dedicated reader or a camera-enabled portable device at the screen 380 to scan the displayed QR code. In this case, the dedicated reader or the camera-enabled portable device assembles the different portions 380A-380N of the QR code to obtain the complete QR code shown in FIG. 2A.

Figure 5:
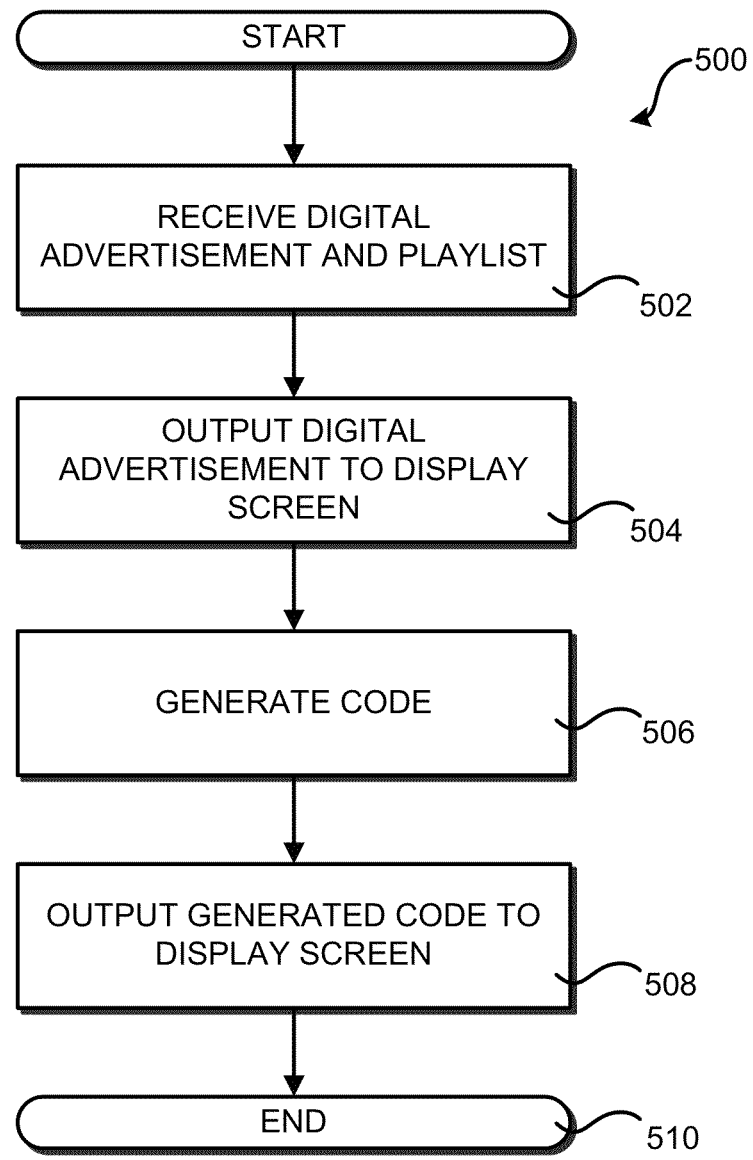
FIG. 5 is a flow diagram showing one illustrative routine for injecting a code into video data so that the code is visually imperceptible or barely perceptible by humans, according to one embodiment disclosed herein.

Referring now to FIG. 5, a flow diagram showing one illustrative routine 500 for injecting a code into a video stream 100 so that the code is visually imperceptible, or barely detectable to humans, according to one embodiment disclosed herein. The routine 500 begins at operation 502, where the digital advertisement 120 and the playlist 140 are received. In the embodiment shown in FIG. 3, for instance, the multimedia player 320 receives both the digital advertisement 120 and the playlist 140, and the code generator 340 receives the playlist 140.

The routine 500 then continues from operation 502 to operation 504, where the digital advertisement 120 is output to the display screen 380 on the basis of information in the playlist 140. As an example, the multimedia player 320 outputs the digital advertisement 120 during a particular time slot, or slots, as specified by the playlist 140. From operation 504, the routine 500 continues to operation 506, where a code is generated based on the information in the playlist 140. As an example, the code generator 340 generates a QR code, which encodes information related to a URL related to a product being advertised by the digital advertisement 120.

The routine 500 then continues to operation 508, where the generated code is output to the display screen 380 based on the information in the playlist 140. As an example, based on the information in the playlist 140, the code injector 360 outputs the code to the display screen 380 once every second for a flash time of $1/500^{th}$ of a second. From operation 508, the routine 500 then proceeds to operation 510, where it ends.

Figure 6:
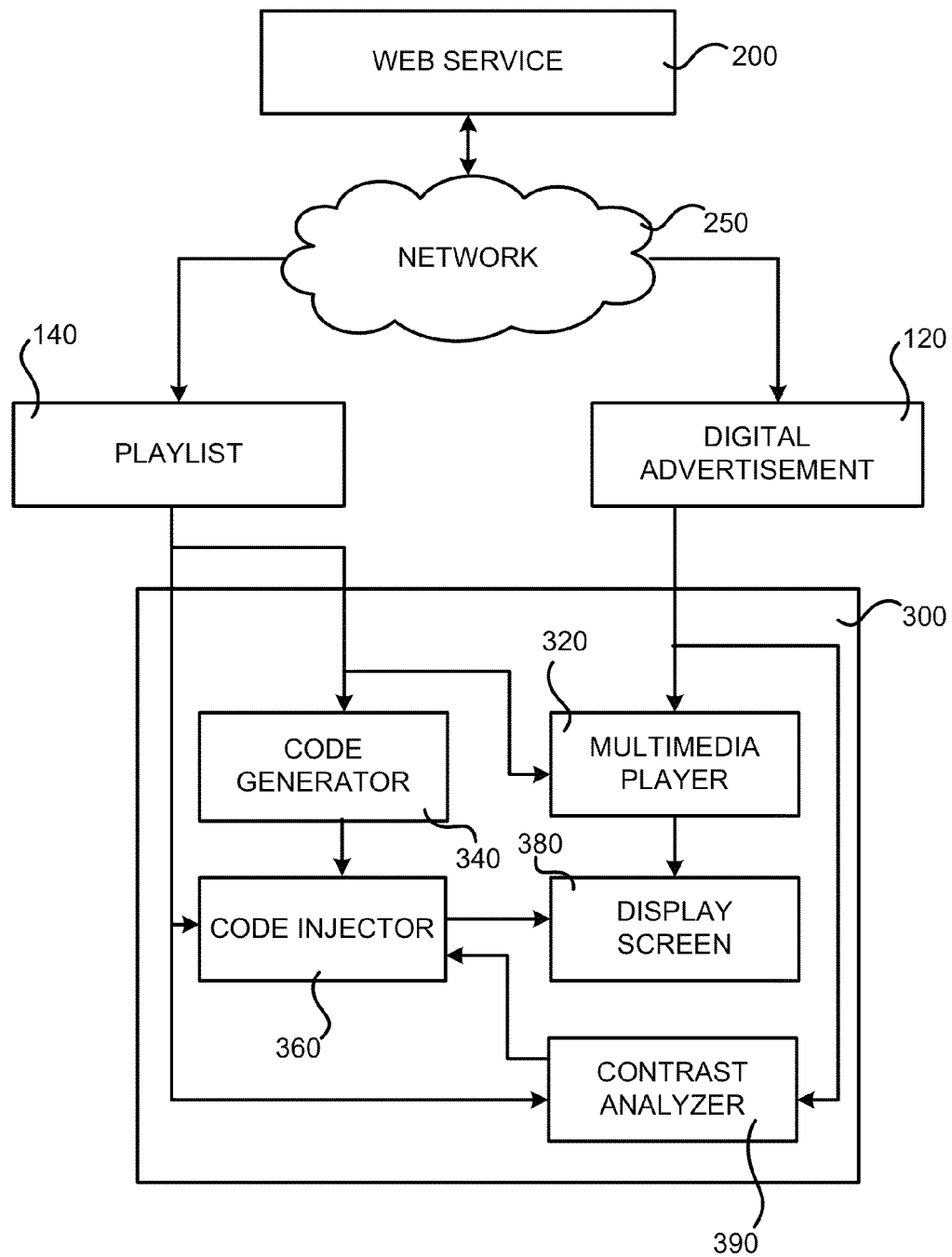
FIG. 6 is a block diagram showing another illustrative configuration for an apparatus capable of injecting a code into video data without human perception or with limited human perception, according one embodiment disclosed herein.

FIG. 6 is a block diagram showing another illustrative configuration for an apparatus 300 capable of injecting a code into a video stream 100 without human perception, or with limited human perception, according one embodiment disclosed herein. The configuration of the apparatus 300 shown in FIG. 6 is similar to the embodiment shown in FIG. 3. However, in the embodiment shown in FIG. 6, the apparatus 300 also includes a contrast analyzer 390.

The contrast analyzer 390 receives the digital advertisement 120 and the playlist 140. The contrast analyzer 390 then determines the degree of contrast between the code to be generated by the code generator 340 and the digital advertisement 120, which is to be output to the display screen 380 by the multimedia player 320. The contrast analyzer 390 subsequently controls the code injector 360 according to the results of such an analysis.

As an example, in response to determining that the contrast between the code and the digital advertisement 120 is high, the contrast analyzer 390 may control the code injector 360 so that the generated code is injected into the digital advertisement 120 for a shorter flash time. For example, rather than injecting the generated code for $1/500^{th}$ of a second every second, the contrast analyzer 390 may control the code injector 360 so that the generated code is injected for an even shorter flash time. This would ensure that the code remains invisible to a human viewer.

As described above, it may be desirable for the code to be minimally detectable by humans, so that persons passing by the digital sign 300 are made aware of the fact that a code has been injected in the digital advertisement 120, after which a portable device or dedicated reader may be used to read the code. In this case, the contrast analyzer 390 may be used to similarly determine the contrast between the code and the digital advertisement 120, and instead of varying the duration of injection, may vary the frequency of injection. By varying the frequency of injection, the visibility of the code may be changed. For example, the code may be made more visibly intrusive to ensure that the audience is made aware of the injection of the code into the digital advertisement 120.

For example, if we assume that the digital advertisement 120 has a frame rate of 300 fps and the playlist 140 specifies that the code is to be injected for a duration corresponding to one frame, or $\frac{1}{300}^{th}$ of a second, the contrast analyzer 390 may control the code injector 360 so that the frequency of code injection is changed. That is, if the contrast analyzer 390 determines that there is low contrast between the code and the digital advertisement 120, the contrast analyzer 390 may control the code injector 360 so that the code is injected more frequently, such as every 0.9 seconds instead of every second. The flash time of $\frac{1}{300}^{th}$ of a second may be kept the same in such a scenario.

In FIGS. 3 and 6, different elements of the apparatus 300 are shown as directly receiving the digital advertisement 120 and the playlist 140. It should be appreciated, however, that the apparatus 300 may further include a storage unit (not shown) where the digital advertisement 120 and the playlist 140 may be stored and subsequently accessed by the elements of the apparatus 300 as needed. The storage unit might also contain computer-executable instructions for performing the operations described herein.

Figure 7:
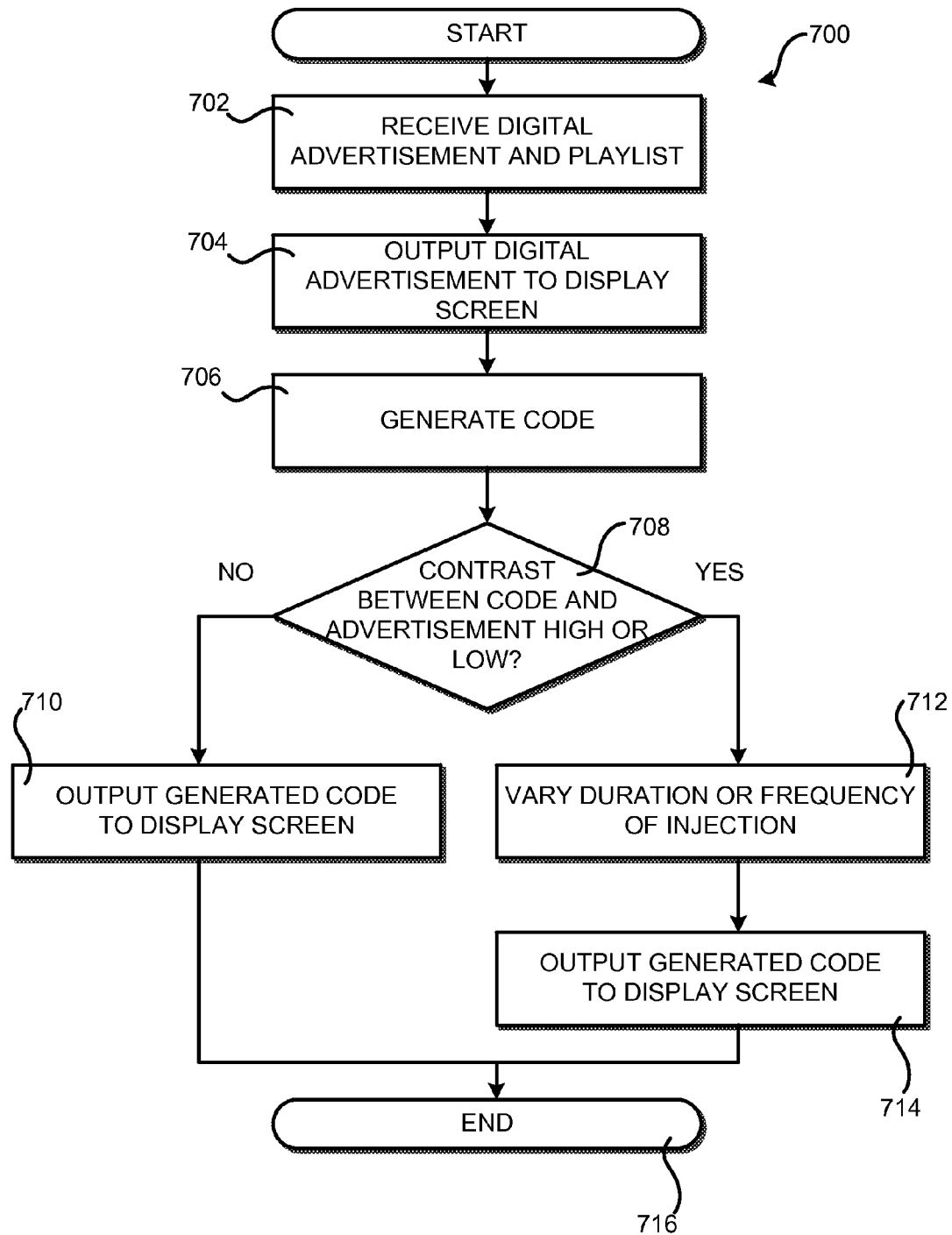
FIG. 7 is a flow diagram showing one illustrative routine for injecting a code into video data so that the code is visually imperceptible or barely detectable to humans, according to another embodiment disclosed herein.

FIG. 7 is a flow diagram showing one illustrative routine 700 for injecting a code into a video stream 100 so that the code is visually imperceptible, or barely detectable by human viewers, according to another embodiment disclosed herein. In this embodiment, the configuration of the digital sign 300 shown in FIG. 6 is utilized.

The routine 700 begins at operation 702, where the digital advertisement 120 and the playlist 140 are received. In the embodiment shown in FIG. 6, the multimedia player 320 receives both the digital advertisement 120 and the playlist 140, the code generator 340 and the code injector 360 receive the playlist 140, and the contrast analyzer 390 receives both the digital advertisement 120 and the playlist 140.

The routine 700 then continues from operation 702 to operation 704, where the digital advertisement 120 is output to the display screen 380 on the basis of information in the playlist 140. As an example, the multimedia player 320 outputs the digital advertisement 120 during a particular time slot, or slots, as specified by the playlist 140.

From operation 704, the routine 700 continues to operation 706, where a code is generated based on the information in the playlist 140. As an example, the code generator 340 generates a QR code, which encodes information related to a URL related to a product being advertised by the digital advertisement 120.

The routine 700 then continues from operation 706 to operation 708, where a determination is made as to whether the contrast between the generated code and the digital advertisement 120 is particularly low or particularly high. As an example, the contrast analyzer 390 may perform a pixel-by-pixel comparison between the generated code and the frames of the digital advertisement 120 before and after when the code is to be injected to determine whether the contrast therebetween is high.

If, at operation 708, the contrast between the generated code and the digital advertisement 120 is not particularly high or particularly low, the routine 700 proceeds to operation 710, where the generated code is output to the screen 380 based on the information in the playlist 140. As an example, based on the information in the playlist 140, the code injector 360 outputs the code to the screen 380 once every second for a duration of $\frac{1}{500}^{th}$ of a second.

If, at operation 708, the contrast between the generated code and the digital advertisement 120 is particularly high or particularly low, the routine 700 proceeds to operation 712, where the flash time or frequency of injection is varied. For example, the playlist 140 may include injection parameters, and in this case, the injection parameters in the playlist 140 would be changed. For instance, if it is determined that the contrast between the generated code and the digital advertisement 120 is particularly high and it is desired that the generated code remain invisible to the audience, the flash time of the generated code may be reduced, as described above. As another example, if it is determined that the contrast between the generated code and the digital advertisement 120 is particularly low and it is desired that the generated code remain minimally visible to the audience, the frequency of injection of the generated code may be increased, as described above. From operation 712, the routine 700 branches to operation 714, where the generated code is output to the display screen 380 based on the changed injection parameters in the playlist 140. From operations 710 and 714, the routine 700 proceeds to operation 716, where it ends.

Because, as discussed above, a code might be imperceptible or minimally perceptible to human beings, it might be difficult for humans to known when a particular digital sign is displaying a code. As a result, embodiments disclosed herein might also provide functionality for indicating that a QR code has been embedded in a picture or video, while still showing the picture or video. In order to provide this functionality, an indication might be provided indicating that a digital sign is displaying a QR code, even though the actual display of the QR code might be imperceptible or minimally perceptible by a human.

In order to provide an indication that a digital sign is displaying a code, the three squares inside another square in the top two and bottom left corners of a standard QR code may be displayed superimposed on top of a displayed image or video in one embodiment. The actual QR code frame may be displayed in the manner described above, wherein the QR code is displayed every so many frames in between video frames. This allows a video to be displayed with an integrated QR code and, at the same time, to provide an indication that a QR code is available to a viewer.

In previous solutions where QR codes are displayed only at the end of an advertising video clip, consumers might lose interest and potential customers could be lost. Using this mechanism, a consumer can be notified that a QR code is available and obtain the QR code prior to the end of a video clip. It should be appreciated that the indication described above whereby the concentric squares within a QR code are displayed to indicate that a QR code has been embedded in a video is merely illustrative and that other types of indications might also be provided.

Figure 8:
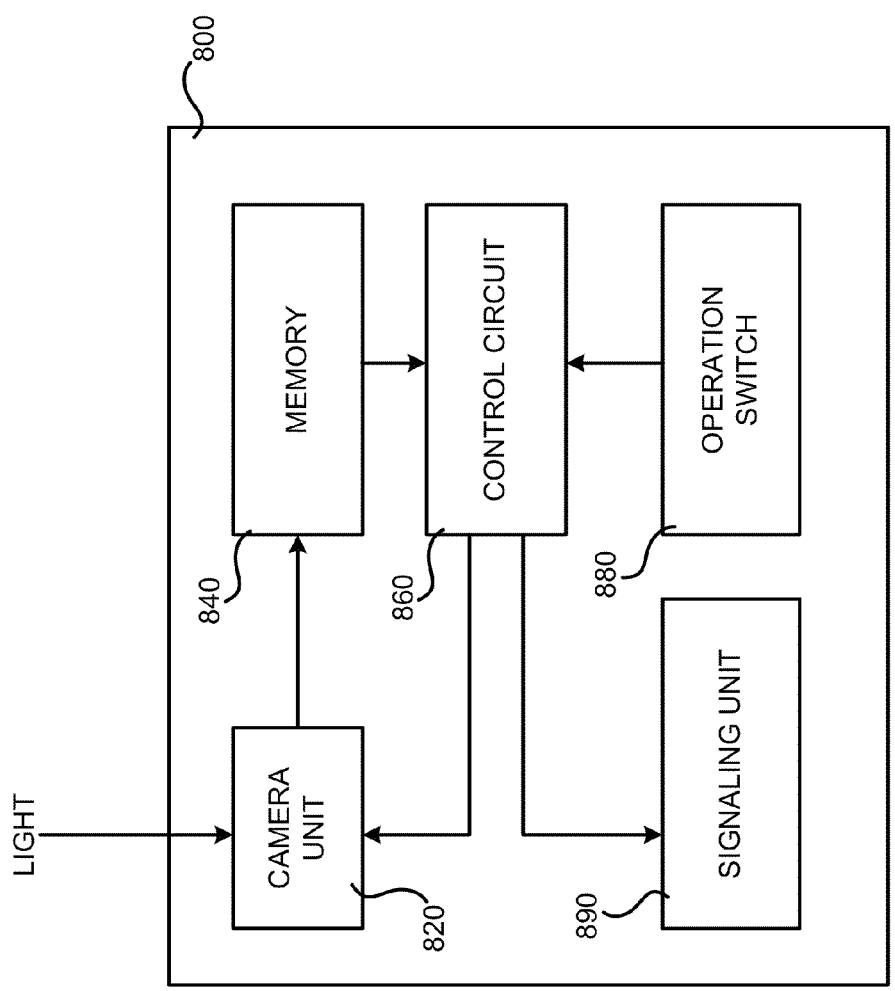
FIG. 8 is a block diagram showing one illustrative configuration for a portable device capable of detecting the presence of and reading a code that has been injected into video data in a manner that is visually imperceptible or barely detectable to humans, according to one embodiment disclosed herein.

FIG. 8 shows a block diagram of an embodiment of a portable device 800 capable of detecting the presence of and reading a code that has been injected into a video stream 100 in a manner that is visually imperceptible, or barely detectable to humans. The portable device 800 capable of detecting the presence of and reading a code injected into video data in a manner that is visually imperceptible or barely detectable to humans includes a camera unit 820, a memory 840, a control circuit 860, an operation switch 880, and a signaling unit 890 in one embodiment disclosed herein. The portable device 800 might also include other elements.

The camera unit 820 includes components for converting incoming light into digital data. For example, the camera unit 820 may include a lens, an image sensor, an amplifier, an analog-to-digital-converter circuit, and other components. The control circuit 860 controls the camera unit 820. As an example, in response to receiving a start signal from the operation switch 880, which may be controlled by a user, the control circuit 860 may control the camera unit 820 to convert incoming light into digital data, and subsequently transmit the digital data to the memory 840 where the digital data is stored. Conventional digital camera components might be utilized in this regard.

The control circuit 860 analyzes the stored digital data to determine if a code is included therein. If the control circuit 860 determines that a code is included in the digital data, the control circuit 860 subsequently deciphers the code to obtain the encoded information. The encoded information might then be displayed to a user or otherwise utilized.

In some embodiments, the control circuit 860 performs operations such that the camera unit 820 continuously converts incoming light into digital data and transmits the digital data to the memory 840 until the control circuit 860 has deciphered the code in the digital data, or determines that there is no code in the digital data. In some embodiments, the control circuit 860 may output an alert signal via the signaling unit 890 to inform the user either that the code in the digital data has been deciphered or that there is no code in the digital data.

The signaling unit 890 may include components to provide an auditory, visual, or vibratory signal, or a combination of these signals to the user. Such components of the signaling unit 890 may already be provided as part of the portable device 800. For example, the portable device 800 may be a smartphone, which may already include a camera, a speaker, a light-emitting diode, a vibrating device, and other similar components to provide such a signal to the user.

In some embodiments, the alert signal output through the signaling unit 890 may provide an indication to the user that he or she may release the operation switch 880 so that the camera unit 820 discontinues capturing images. That is, in some embodiments, the user may aim the portable device 800 at a digital sign and subsequently press the operation switch 880. The control circuit 860 may then determine either that the code in the obtained digital data has been deciphered or that there is no code in the digital data. Finally, the control circuit 860 may then perform operations so that an alert signal is output through the signaling unit 890, thereby letting the user know that the operation switch 880 may be released.

In some embodiments, the operation switch 880 may be pressed and immediately released by the user, and in response to such control of the operation switch 880 by the user, the control circuit 860 may control the camera unit 820 to convert incoming light into digital data for a predetermined period of time, and subsequently transmit the digital data to the memory 840 where it is stored. Such a predetermined period of time may be selected based on tests performed to determine a sufficient time for the control circuit 860 to decipher the code in the digital data, or to determine that there is no code in the digital data.

Figure 9:
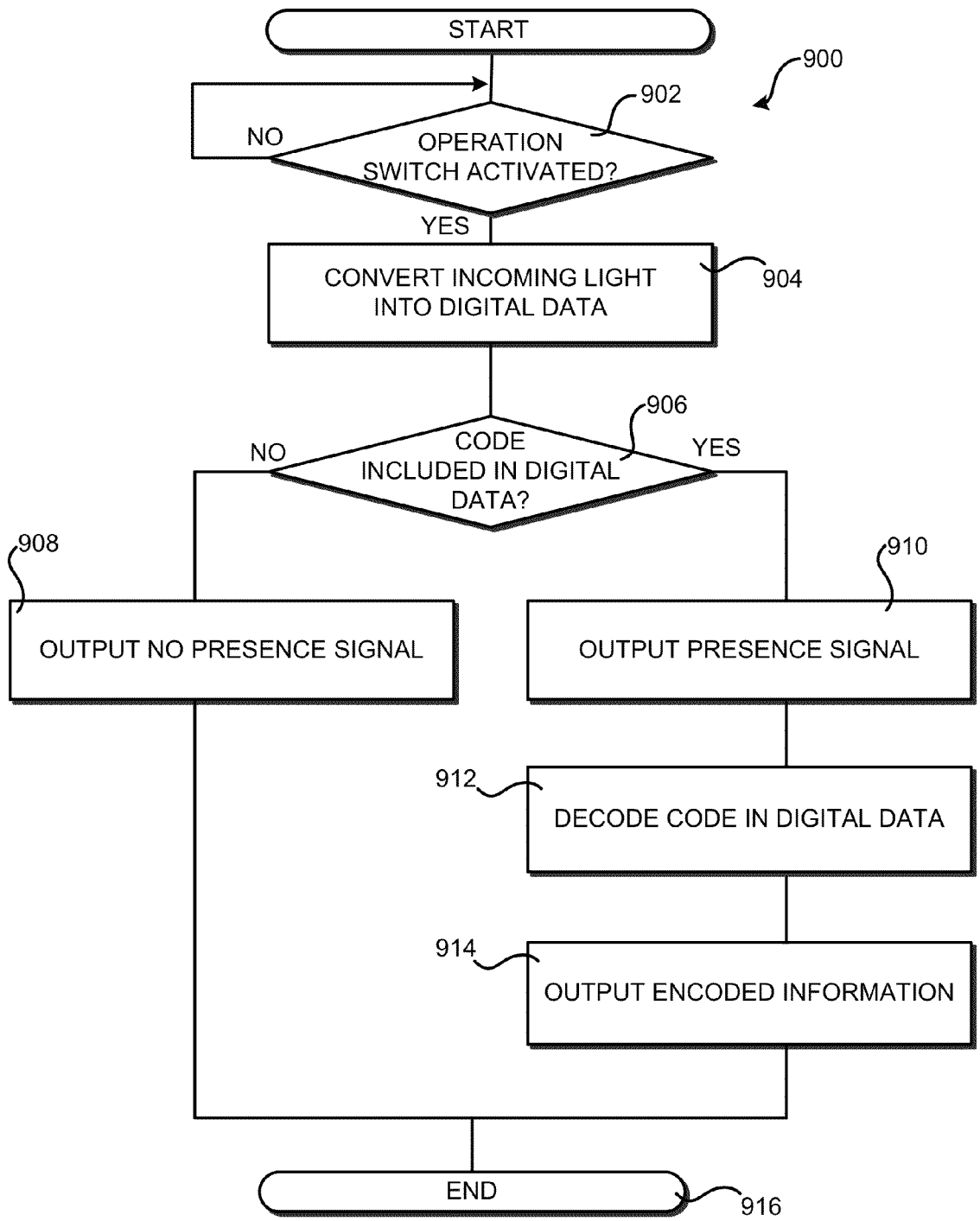
FIG. 9 is a flow diagram showing one illustrative routine for detecting the presence of and reading a code injected into video data in a manner that is visually imperceptible or barely detectable to humans, according to one embodiment disclosed herein.

FIG. 9 is a flow diagram showing one illustrative routine 900 for detecting the presence of and reading a code that is injected into a video stream 100 in a manner that is visually imperceptible, or barely detectable to human viewers, according to an embodiment disclosed herein. The routine 900 begins at operation 902, where a determination is made as to whether the operation switch 880 has been activated. If the operation switch 880 has not been activated, the routine 900 returns back to operation 902 for another such determination. If the operation switch 880 has been pressed, the routine 900 continues from operation 902 to operation 904.

At operation 904, incoming light is converted into digital data, and the digital data is stored. For example, the control circuit 860 may perform operations such that the camera unit 820 continuously converts incoming light into digital data and stores the digital data in the memory 840. From operation 904, the routine 900 continues to operation 906, where a determination is made as to whether a code is included in the digital data. For example, the control circuit 860 may analyze the digital data stored in the memory 840 to determine if a code is included therein.

If, at operation 906, a code is not identified in the digital data, the routine 900 proceeds to operation 908, where a corresponding, no presence signal is output to the user. For example, the control circuit 860 may control the signaling unit 890 such that a red flashing light is shown and an audible alarm is emitted so that the user knows that there is no code in the digital data. The signal may also provide an indication to the user that the operation switch 880 may be released.

If, at operation 906, a code is included in the digital data, the routine 900 continues to operation 910, where a corresponding presence signal is output to the user. For example, the control circuit 860 may control the signaling unit 890 such that a green flashing light is shown and a bell sound is emitted so that the user knows a code is contained in the digital data. Also, the signal may provide an indication to the user that the operation switch 880 may be released.

From operation 910, the routine 900 continues to operation 912, where the code in the digital data is decoded to obtain the encoded information. That is, the control circuit 860 may decode the code in the digital data to obtain the encoded information. The routine 900 then continues to operation 914, where the encoded information is output to the user. For example, the control circuit 860 may output the encoded information via a screen (not shown) of the portable device 800. From operations 908 and 914, the routine 900 proceeds to operation 916, where it ends.

As mentioned above, some of the functionality disclosed herein might be performed by executing instructions on a general or specific-purpose processor. In order to provide such functionality, instructions for performing the various processes disclosed herein might be encoded on a computer-readable storage medium for execution by a processor, such as the memory 840. It should be appreciated by those skilled in the art that computer-readable storage media can be any available media that provides for the storage of non-transitory data and that may be accessed by a processor.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In some embodiments, a QR code presented in the manner described above might be utilized by advertisers to track the response to an advertisement. For example, in one implementation, a QR code might have an additional tracking component that adds the specific location of the digital sign where the QR code is displayed. This is possible because, as described above, the QR code is generated by the digital sign's multimedia player and is not part of the video stream. In this example, the QR code then may be utilized to transmit information to the advertising Web service 200 indicating the time and location that the advertisement was played and information identifying the digital sign.

The Web service 200 might then log this information in a database, which may be later used to determine the effectiveness and response to the advertisement from the specific digital sign at the specific time. This data might also be made available to an advertiser as part of an advertising campaign as a part of a service or agreement, but may also be sold as a separate service to advertisers to provide valuable feedback about the effectiveness of a particular advertising campaign in a particular place at a particular time. Additionally, such feedback data might also be used generally for other advertisers considering other advertising campaigns to identify the locations that obtain the most interaction from users.

The Web service 200 might also utilize the information described above to determine the advertising value of a digital sign implemented in the manner described herein. For example, a data-mining algorithm might be executed in a data center across data collected for a number a number of digital signs in the manner described above. The algorithm might be utilized to calculate an advertising price for advertising on each digital sign based on the number of times QR codes were accessed on each digital sign relative to other digital signs in other locations and their respective numbers of accesses. The collected information might also be utilized for other purposes.

Based on the foregoing, it should be appreciated that technologies have been described herein for injecting a code into video data without human perception or with limited human perception. Although the embodiments described herein have been described in language specific to hardware structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for injecting a code into video data without or with limited human perception, the method comprising performing computer-implemented operations for:
    receiving a playlist and a digital advertisement;
    outputting the digital advertisement to a display screen on the basis of information in the playlist;
    generating a code based on the information in the playlist;
    outputting the generated code to the screen,
    wherein outputting the generated code to the screen comprises flashing the generated code on the display screen at a predetermined flash frequency and for a predetermined flash time so that the generated code is visually imperceptible or barely detectable to a human viewer; and
    determining whether a contrast between the generated code and the digital advertisement is high or low, and changing the flash frequency or the flash time in response to determining that the contrast between the generated code and the digital advertisement is high or low.

2. The computer-implemented method of claim 1, wherein the flash time is reduced so that the generated code remains visually imperceptible to a human viewer in response to determining that the contrast between the generated code and the digital advertisement is high.

3. The computer-implemented method of claim 1, wherein the generated code comprises a QR code.

4. The computer-implemented method of claim 1, wherein the generated code comprises a UPC.

5. A computer-implemented method for injecting a code into video data without or with limited human perception, the method comprising performing computer-implemented operations for:
    receiving a playlist and a digital advertisement;
    outputting the digital advertisement to a display screen on the basis of information in the playlist;
    generating a code based on the information in the playlist; and
    outputting the generated code to the screen,
    wherein outputting the generated code to the screen comprises flashing the generated code on the display screen at a predetermined flash frequency and for a predetermined flash time so that the generated code is visually imperceptible or barely detectable to a human viewer,
    wherein the digital advertisement comprises a video stream having an inherent frame rate, and wherein the flash time corresponds to the duration of one frame in the video stream, and the generated code is flashed every second.

6. The computer-implemented method of claim 5, wherein a physical size of the generated code when flashed on the screen corresponds substantially to a physical size of each frame in the video stream when output to the display screen.

7. A computer-implemented method for injecting a code into video data without or with limited human perception, the method comprising performing computer-implemented operations for:
    receiving a playlist and a digital advertisement;
    outputting the digital advertisement to a display screen on the basis of information in the playlist;
    generating a code based on the information in the playlist; and
    outputting the generated code to the screen,
    wherein outputting the generated code to the screen comprises flashing the generated code on the display screen at a predetermined flash frequency and for a predetermined flash time so that the generated code is visually imperceptible or barely detectable to a human viewer, and
    wherein the generated code is flashed for $1/500^{th}$ of a second or shorter so that the generated code is visually imperceptible to a human viewer.

8. A computer-implemented method for injecting a code into video data without or with limited human perception, the method comprising performing computer-implemented operations for:
    receiving a playlist and a digital advertisement;
    outputting the digital advertisement to a display screen on the basis of information in the playlist;
    generating a code based on the information in the playlist;
    outputting the generated code to the screen, wherein outputting the generated code to the screen comprises flashing the generated code on the display screen at a predetermined flash frequency and for a predetermined flash time so that the generated code is visually imperceptible or barely detectable to a human viewer; and
    dividing the generated code into a plurality of portions, and wherein outputting the generated code to the screen comprises flashing the portions to the screen consecutively until all the individual portions of the generated code have been shown, and wherein each of the portions is flashed for the flash time and the flashing of all of the individual portions forming the generated code occurs one time at the flash frequency.

9. A computer-controlled apparatus for injecting a code into video data without or with limited human perception, the apparatus comprising:
   a display screen;
   a multimedia player configured to output a digital advertisement to the display screen on the basis of information in a playlist;
   a code generator configured to generate a code based on the information in the playlist;
   a code injector configured to output the generated code to the display screen, wherein the code injector is configured to output the generated code by flashing the generated code on the display screen at a predetermined flash frequency and for a predetermined flash time so that the generated code is visually imperceptible or barely detectable to a human viewer; and
   a contrast analyzer configured to determine whether a contrast between the generated code and the digital advertisement is high or low, and to control the code injector to change the flash frequency or the flash time in response to determining that the contrast between the generated code and the digital advertisement is high or low.

10. The computer-controlled apparatus of claim 9, wherein the contrast analyzer controls the code injector to reduce the flash time so that the generated code remains visually imperceptible to a human viewer, in response to determining that the contrast between the generated code and the digital advertisement is high.

11. A computer-controlled apparatus for injecting a code into video data without or with limited human perception, the apparatus comprising:
   a display screen;
   a multimedia player configured to output a digital advertisement to the display screen on the basis of information in a playlist;
   a code generator configured to generate a code based on the information in the playlist;
   a code injector configured to output the generated code to the display screen, wherein the code injector is configured to output the generated code by flashing the generated code on the display screen at a predetermined flash frequency and for a predetermined flash time so that the generated code is visually imperceptible or barely detectable to a human viewer,
   wherein the digital advertisement comprises a video stream having an inherent frame rate, and wherein the code injector is configured to output the generated code to the display screen at a flash time corresponding to the duration of one frame in the video stream and to flash the generated code at a flash frequency of once every second.

12. The computer-controlled of claim 11, wherein a physical size of the generated code when flashed on the display screen corresponds substantially to a size of each frame in the video stream when output to the display screen.

13. The computer-controlled apparatus of claim 11, wherein the generated code comprises a QR code.

14. The computer-controlled apparatus of claim 11, wherein the generated code comprises a UPC.

15. A computer-controlled apparatus for injecting a code into video data without or with limited human perception, the apparatus comprising:
   a display screen;
   a multimedia player configured to output a digital advertisement to the display screen on the basis of information in a playlist;
   a code generator configured to generate a code based on the information in the playlist;
   a code injector configured to output the generated code to the display screen, wherein the code injector is configured to output the generated code by flashing the generated code on the display screen at a predetermined flash frequency and for a predetermined flash time so that the generated code is visually imperceptible or barely detectable to a human viewer, and
   wherein the code injector is further configured to divide the generated code into a mosaic of individual portions;
   outputting the generated code to the screen by the code injector comprises flashing the individual portions to the display screen consecutively until all the individual portions of the generated code have been shown; and
   each of the individual portions is flashed for the predetermined flash time and the flashing of all of the individual portions forming the mosaic of the generated code occurs one time at the predetermined flash frequency.

16. A computer-implemented method for reading a code that has been injected into video data in a manner that is visually imperceptible or barely detectable to a human viewer, comprising performing computer-implemented operations for:
   in response to determining that an operation switch has been activated, converting incoming light into digital data and storing the digital data in a memory;
   performing a frame-by-frame analysis of the digital data stored in the memory to determine whether a code that has been flashed for $1/300^{th}$ of a second or shorter is included in the digital data;
   outputting a signal indicating that a code is included in the digital data, in response to determining that a code that has been flashed for $1/300^{th}$ of a second or shorter is included in the digital data;
   decoding the code in the digital data to obtain information encoded by the code; and
   outputting the encoded information.

17. The computer-implemented method of claim 16, further comprising outputting a signal indicating that a code is not included in the digital data, in response to determining that a code that has been flashed for $1/300^{th}$ of a second or shorter is not included in the digital data.

18. The computer-implemented method of claim 16, wherein performing a frame-by-frame analysis of the digital data stored in the memory comprises determining whether a QR code that has been flashed for $1/300^{th}$ of a second or shorter is included in the digital data.

* * * * *